United States Patent [19] [11] 3,945,301
Buente et al. [45] Mar. 23, 1976

[54] SPOOL VALVE FOR HYDRAULIC BRAKE BOOSTER
[75] Inventors: Stephen M. Buente; Lloyd G. Bach, both of South Bend, Ind.
[73] Assignee: The Bendix Corporation, South Bend, Ind.
[22] Filed: Apr. 1, 1974
[21] Appl. No.: 456,934

[52] U.S. Cl.............. 91/442; 91/391 R; 91/451
[51] Int. Cl.² F15B 13/10; F15B 11/08; F15B 13/04
[58] Field of Search.......... 91/451, 391 R, 439, 442, 91/268

[56] References Cited
UNITED STATES PATENTS

| | | | |
|---|---|---|---|
| 1,029,247 | 6/1912 | Wilcox | 91/442 |
| 3,006,323 | 10/1961 | Tilney | 91/439 |
| 3,158,068 | 11/1964 | Bokelman | 91/439 |
| 3,724,332 | 4/1973 | Bach | 91/391 R |
| 3,751,912 | 8/1973 | Bach | 91/391 R |
| 3,768,371 | 10/1973 | Orme | 91/451 |

Primary Examiner—Paul E. Maslousky
Attorney, Agent, or Firm—Ken C. Decker; William N. Antonis

[57] ABSTRACT

A hydraulic brake booster is disclosed for use in a vehicle hydraulic braking system. The booster provides a spool valve having spaced lands and grooves cooperating with corresponding lands and grooves on the booster housing to control communication between an inlet port, an outlet port, an exhaust port, and the booster pressure chamber. The spool valve has an internal passage which communicates the booster pressure chamber to one of the aforementioned ports depending upon the position of the spool valve. A check valve is provided in a branch passage communicating with the groove communicated with the booster inlet port so that the pressure level in the pressure chamber never exceeds the pressure level at the inlet regardless of the position of the spool valve. This feature enhances spool stability.

7 Claims, 5 Drawing Figures

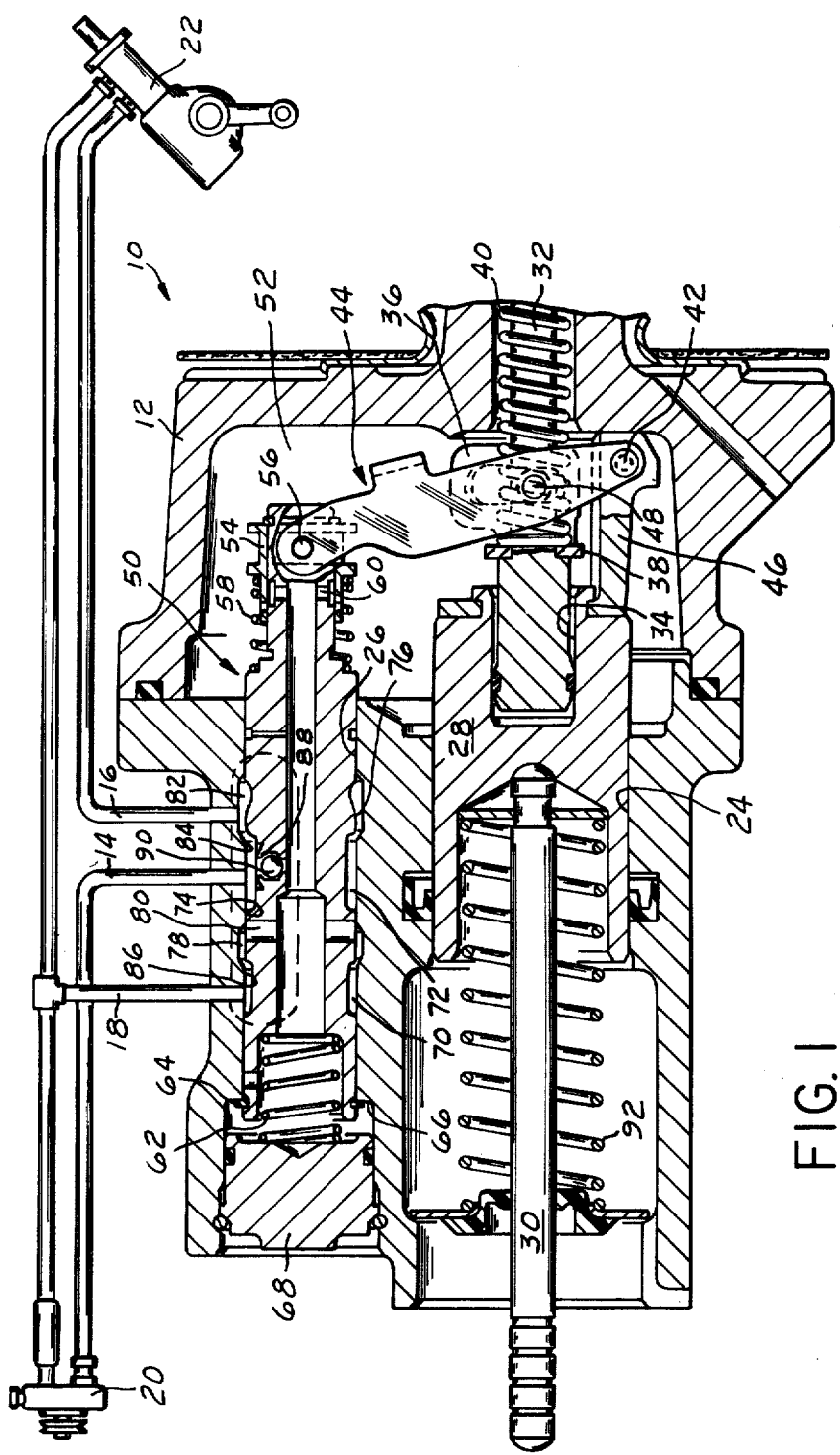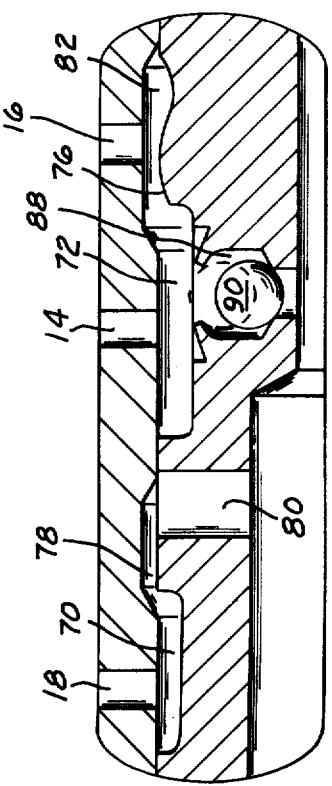
FIG. 1
FIG. 2

SPOOL VALVE FOR HYDRAULIC BRAKE BOOSTER

BACKGROUND OF THE INVENTION

This invention relates to a hydraulic brake booster for automotive vehicles.

Because of their inherent advantages, hydraulic brake boosters are replacing the more conventional vacuum type boosters on certain automotive applications. A typical hydraulic brake booster design provides a spool valve, the position of which is controlled by the vehicle operator to establish a desired fluid pressure level in the pressure chamber of the booster to thereby effect a controlled brake application. Hydraulic brake boosters are capable of modulation; that is, the pressure level in the booster pressure chamber is responsive to changes of the operator-applied input force on the brake pedal. However, if the vehicle operator rapidly changes the pedal force, such as by fully applying the brakes and then partially releasing them, a situation may occur when the spool valve becomes unstable. Also, when the hydraulic brake booster is used in a braking system which includes a hydraulically actuated adaptive braking modulator, pressure impulses may be transmitted to the booster pressure chamber during cycling of the modulator. While these pressure impulses are so small that they cannot be felt by the vehicle operator, they do generate a hydraulic applying force on the spool valve, supplementing the operator-applied force on the spool valve. Although these pressure impulses may be very small in magnitude, their rapid occurrence sometimes causes an unstable condition in the spool valve.

SUMMARY OF THE INVENTION

Therefore, an important object of our invention is to improve the stability of the spool valve used in a conventional hydraulic brake booster.

Another important object of our invention is to insure that the pressure level in the booster pressure chamber of a hydraulic brake booster never exceeds the pressure level in the inlet port of the latter.

Still another important object of our invention is to prevent unpleasant pedal "feel" and annoying noises due to valve instability in the spool valve of the hydraulic brake booster.

A still further important object of our invention is to permit the vehicle operator to quickly apply and then partially release the vehicle's brakes without causing a valve instability.

A still further object of our invention is to permit operation of a hydraulic brake booster in a braking system including a hydraulically actuated adaptive braking system while preventing the spool valve used in the booster from becoming unstable.

DESCRIPTION OF THE DRAWINGS

FIG. 1 is a schematic illustration of a vehicle hydraulic system with a brake booster made pursuant to the teachings of our present invention illustrated in cross section;

FIG. 2 is an enlarged, fragmentary view of circumscribed portion of FIG. 1;

DETAILED DESCRIPTION

Figure 3:
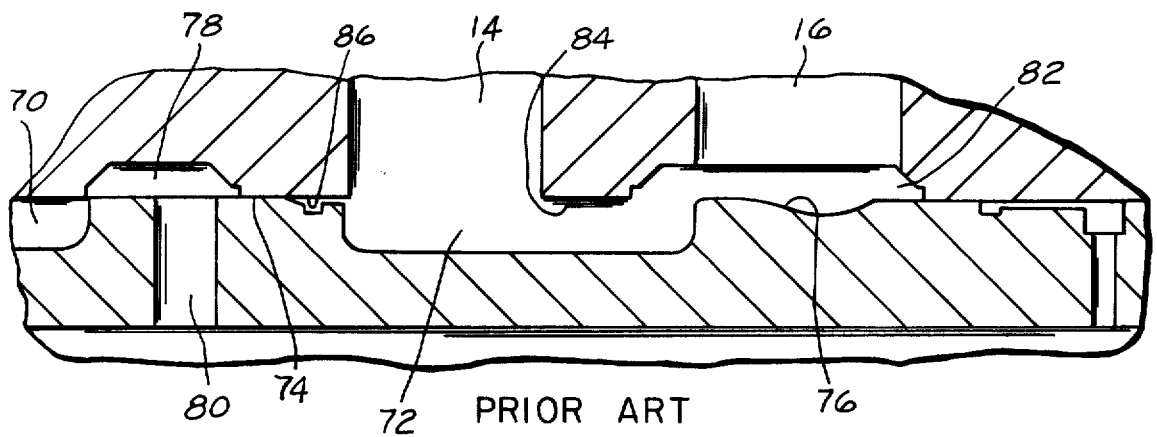
FIG. 3 is an enlarged fragmentary view similar to FIG. 2, but illustrating the prior art brake booster with the spool valve in one position.

Referring now to the drawings, the brake booster generally indicated by the numeral 10 includes a housing 12 having an inlet port 14, an outlet port 16, and a return or exhaust port 18. The inlet port 14 is communicated to the outlet or high pressure side of the vehicle power steering pump 20, and the outlet port 16 is communicated to the inlet of the vehicle power steering gear 22. The exhaust port 18 and the outlet of the gear 22 are each connected to a reservoir (not shown) at the inlet or low pressure side of the pump 20.

The housing 12 defines first and second bores 24 and 26 therewithin. A piston 28 is slidably mounted in the bore 24 and is provided with a connecting rod 30 which transmits movement of the piston 28 to a conventional automotive master cylinder (not shown) which is mounted just to the left of the housing 12, viewing FIG. 1. Of course, movement of the piston 28 to the left generates pressure in the aforementioned master cylinder in the conventional manner. One end of another rod 32 is slidably received in a blind bore 34 in the piston 28, and the opposite end of the rod 32 is connected to a conventional brake pedal (not shown) mounted in the vehicle operator's compartment. A bracket 36 is slidably mounted on the rod 32 and is urged into engagement with a stop ring 38 by a spring 40. A first pivot 42 connects one end of lever means 44 to a bracket 46 which is integral with the piston 28, and a second pivot 48 connects the intermediate portion of the piston means 44 with the bracket 36.

A spool valve generally indicated by the numeral 50 is slidably mounted in the bore 26 and is adapted to control fluid communication into the booster pressure chamber 52. A secondary valve 54 is slidably mounted on the end of the spool valve 50 extending into the pressure chamber 52, and a third pivot 56 connects the lever means 44 with the secondary valve 54. A spring 58 yieldably urges the secondary valve 54 away from openings 60 in the body of the spool valve 50. Another spring 62 yieldably urges the spool valve 50 into a first or brake-released position defined by the engagement of a stop 64 carried on the spool valve 50 with a shoulder 66 provided on the wall of the bore 26. The second or brake fully applied position of the spool valve 50 is defined by the engagement of the left hand end of the spool valve 50 with a plug 68 which closes the bore 26.

The spool valve 50 is provided with a groove 70 which communicates with the exhaust port 18 and a groove 72 which communicates with the inlet port 14. Spool valve 50 further includes a pair of lands 74, 76 which define the edges of the groove 72. Grooves 70 and 72, and lands 74, 76 cooperate with corresponding grooves 78, 82 and lands 84, 86 on the wall of the bore 26 to control communication into the pressure chamber 52. For example, groove 78 communicates with passage means 80 defined within the spool valve 50 which communicates the groove 78 with the openings 60, and groove 82 communicates with the outlet port 16. Lands 84, 86 define the edges of the grooves 78 and 82. A branch 88 of the passage means 80 communicates with the groove 72, and a check valve 90 permits communication from the passage into the groove, but prevents communication in the reverse direction.

MODE OF OPERATION

Figure 5:
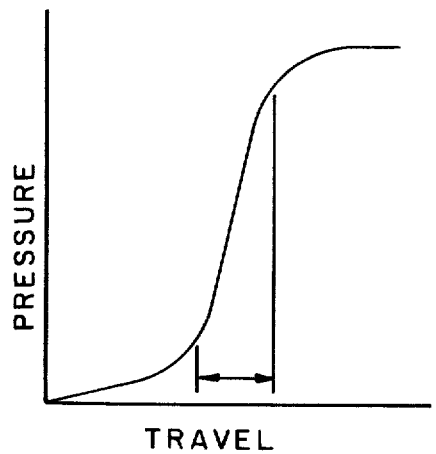
FIG. 5, is a graphical representation of the relationship between spool valve travel and pressure generated in the booster inlet.

When a brake application is effected, rod 32 is urged to the left, viewing the Figure, thereby pivoting lever means 44 about pivot 42, to shift spool valve 50 to the left viewing FIG. 1. When this occurs, the orifice defined between the lands 76 and 84 is narrowed, thereby restricting communication between the grooves 72 and 82 to thereby increase the fluid pressure level in the groove 72. As can be seen in FIG. 5, pressure developed in the groove 72 is a function of spool travel, but most of the pressure development occurs within a relatively small range of spool travel. The position of the spool, and therefore the size of the orifice between the grooves 72 and 82, is controlled by the force exerted on the brake pedal by the vehicle operator. At the same time, land 74 moves away from land 84, to thereby communicate the groove 72 with the groove 78 and therefore to the pressure chamber 52 through passage 80. The land and grooves are designed such that just before the land 74 opens from the land 84, the land 74 closes against land 86 to thereby prevent communication between the groove 78 and the groove 80. Therefore, fluid pressure developed in the groove 72 is communicated into the pressure chamber 52 wherein it reacts on the right hand end face of the piston 28 to urge the latter to the left viewing FIG. 1, thereby developing pressure in the aforementioned master cylinder in the normal manner. When the vehicle operator releases the brakes, spring 62 urges spool valve 50 to the right, viewing FIG. 1, toward the brake release position wherein the communication between grooves 72 and 82 is unrestricted and the pressure chamber 52 is vented to the exhaust port 18 through the grooves 78 and 70. When this occurs, return spring 92 urges the piston 28 to the right viewing the Figure, toward the brake release position. In case of failure of fluid pressure to communicate into the pressure chamber 52, due either to a malfunction in the power steering pump 20, such as would occur when the vehicle's engine dies, or to a sticky spool valve, a brake application may still be effected manually. When this occurs, the increased actuating force required on rod 32 collapses the spring 40 to permit the left-hand end of rod 32 to engage the closed end of the blind bore 34, to thereby provide a direct mechanical link between the brake pedal and the aforementioned master cylinder. When this occurs, lever means 44 slides the fixture 54 relative to the spool valve 50 to close the opening 60 to thereby prevent an abrupt power brake application should the sticky spool valve free itself or should the pump 20 suddenly begin operation.

Although the valve 50 normally modulates the pressure level in the pressure chamber 52 quite well in response to changes in the force applied to the input rod 32, there are situations when the valve 50 may become unstable if the force applied to the rod 32 is changed quickly, thereby causing abrupt changes in the pressure level in the chamber 52. If this occurs, these abrupt changes will be felt by the vehicle operator since the pressure level in the chamber 52 reacts upon the rod 32 to provide braking "feel." These rapid changes in pressure in the pressure chamber 52 also act upon the right-hand end of the spool valve 50, to hydraulically urge the latter to the left viewing the Figure, driving the left-hand end of the valve 50 into engagement with the plug 68, causing an unpleasant "clicking" noise. This most often occurs when the vehicle operator initiates braking with a relatively large force on the input rod 32, thereby moving the spool valve 50 towards its extreme leftwardmost position, and then relieves the pedal force somewhat to establish the valve in an intermediate pressure position. When the initial hard application occurs, the valve is moved to a condition in which the land 76 laps the land 84 to rapidly build pressure in the groove 72, which in turn is communicated into the pressure chamber 52 to initiate a hard brake application. When this high force on rod 32 is abruptly removed, the valve returns to some intermediate position, but momentarily "overshoots" this intermediate position and momentarily occupies the position illustrated in FIG. 3. In this position, the passage between land 74 and land 86 is still severely restricted, and the communication between the pressure chamber 52 and the exhaust 18 is cut off, and therefore, the relatively high pressure level generated in the pressure chamber 52 during initial hard application is maintained. However, the orifice between the land 84 and the land 86 is substantially increased, thereby causing the pressure level in the groove 72 to drop substantially. Consequently, the pressure level in the pressure chamber 52 is then much higher than is the pressure level in the groove 72. The spool valve remains in the position illustrated in FIG. 3 only momentarily, and quite quickly moves to the position illustrated in FIG. 4, which is the position established by the force on the input rod 32. In this position, the orifice defined between the lands 84 and 76 is substantially reduced from the size of the orifice established in FIG. 3, and consequently, brake pressure builds in groove 72 again. However, before pressure has a chance to build to any substantial amount in the groove 72, the passage between the lands 86 and 74 is opened, thereby communicating the high pressure fluid trapped in pressure chamber 52 with the relatively low pressure in the groove 72. When this occurs, the pressure difference between the pressure chamber 52 and the pressure level in groove 72 is immediately equalized to some intermediate value causing a sharp drop in the pressure level in chamber 52. Immediately following the sharp drop in boost pressure, the pressure level in chamber 52 begins building again at the same rapid rate as the pressure in groove 72 increases, due to the orifice between lands 84 and 76. This rapid increase in pressure in the pressure chamber 52, which reacts upon the input rod 32, is felt as an unpleasant "kick" by the vehicle operator. This rapid increase in the pressure level in pressure chamber 52 also acts on the right-hand end of the spool valve 50, driving it to the left viewing the Figure, to drive left-hand end of the spool valve into engagement with the plug 68, causing unpleasant "clicking" noise. A similar effect occurs, as has been described hereinabove, when the valve is first released abruptly and then abruptly reapplied. Also, when the brake booster 10 is used in a vehicle hydraulic system having a hydraulically actuated adaptive braking modulator, actuation of the modulator may generate sharp pressure changes in the pressure chamber 52. Although the magnitude of these pressure changes is small enough that they usually cannot be felt by the vehicle operator, they do provide a hydraulic actuation force on the spool valve 50, which may drive the spool valve to a condition illustrated in FIGS. 3 and 4, thereby magnifying the effect of the pressure impulses in the chamber 52 due to the alternating initiating and termination of communication between the booster chamber 52 and the alternating high and low pressure in the groove 72. When this occurs, the pressure changes in the pressure chamber 52 are so great that they are felt by the vehicle operator as the aforementioned unpleasant "kicking" force.

Figure 4:
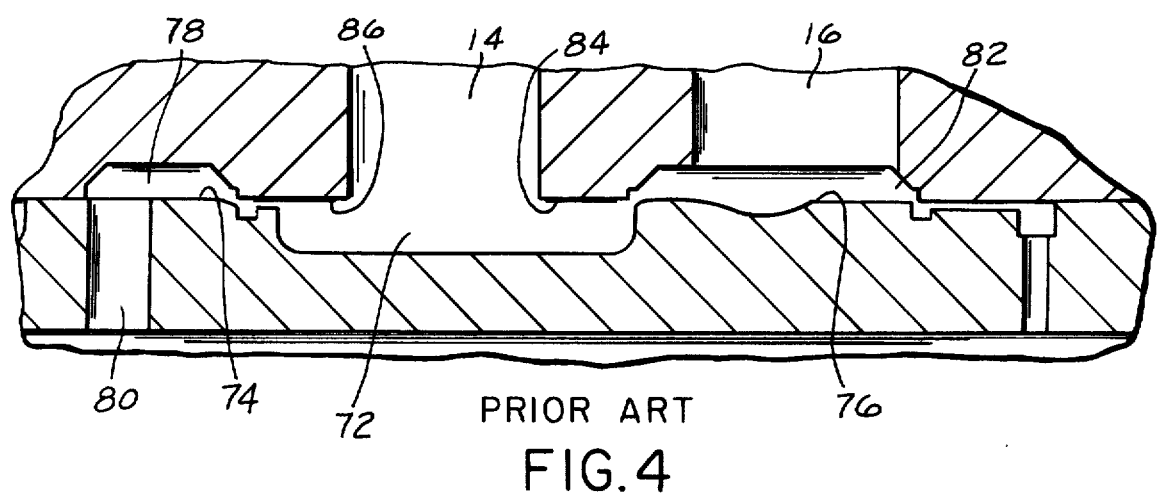
FIG. 4, is a view similar to FIG. 3, but illustrating the spool valve disposed in another position.

It will be noted that the reason for the unpleasant "kickback" force and the unpleasant "clicking" noise is the rapid decay of pressure in chamber 52 followed by rapid rebuilding of pressure in chamber 52 due to movement of the spool valve from the position illustrated in FIG. 3 to the position illustrated in FIG. 4. To eliminate this problem, the check valve 90 vents the pressure chamber 52 to the inlet 14 whenever the pressure level in groove 72 is less than the pressure level in the pressure chamber 52. In this situation, a high pressure level cannot be maintained in the pressure chamber 52 while the pressure in the groove 72 is reduced, as would occur in the prior art brake booster when the valve in the latter is disposed in the position illustrated in FIG. 3. Since, due to the check valve 90, the pressure level in pressure chamber 52 is reduced to a relatively low value when the spool valve is disposed in the position illustrated in FIG. 3, there will be no abrupt drop and then rebuilding of the pressure in the chamber 52 when the spool valve moves to the position illustrated in FIG. 4. Therefore, there also will be no "kickback" force on the input rod 32 and no hydraulic force will act upon the right-hand end of the spool valve 50. Although it would initially seem that it would be relatively unlikely that the spool valve would ever be in the positions illustrated in FIGS. 3 and 4, it must be remembered, as illustrated in FIG. 5, that substantial change in pressure is attained by moving the spool valve a very small amount. It is in this relatively small amount of movement that the spool valve will be disposed in the positions illustrated in FIGS. 3 and 4, and consequently, it is quite possible that the aforementioned rapid decrease and then rapid increase in the pressure level in chamber 52 will occur in the absence of the check valve 90.

We claim:

1. In a hydraulic brake booster:
a housing defining a pressure chamber therewithin;
said housing having an inlet communicated to a fluid pressure source and an outlet;
valve means movable within said housing from a first position venting said pressure chamber and preventing communication from the inlet to the pressure chamber to a second position, said valve means communicating successively higher fluid pressure levels from said inlet into said pressure chamber as the valve means is shifted from said first position;
an output piston slidably mounted in said pressure chamber and responsive to the fluid pressure communicated into the latter;
operator-actuated means for operating said valve means; and
means for releasing the fluid pressure level in the pressure chamber when the pressure level at the inlet is less than the pressure level in the pressure chamber;
said last-mentioned means being check valve means controlling communication between said pressure chamber and the inlet;
said check valve means permitting communication between the pressure chamber and the inlet whenever the pressure level in the pressure chamber exceeds the pressure level in the inlet, but prohibiting communication in the reverse direction;
passage means extending through said valve means to communicate said inlet with said pressure chamber as the valve means is moved away from the first position, said passage means venting the pressure chamber when the valve means is in the first position and communication from said inlet through said passage means is prevented, said valve means controlling communication through said passage means to control the pressure level in the pressure chamber;
said passage means including a branch communicated with said inlet independently of the position of said valve means, said check valve means being located in said branch.

2. The invention of claim 1, wherein said releasing means equalizes the pressure levels in said pressure chamber and in said inlet.

3. The invention of claim 1:
said valve means being a spool valve slidably mounted in said housing, said spool valve having spaced grooves and lands cooperating with corresponding grooves and lands on said housing, one of said grooves communicating with said inlet, said valve means communicating said one groove to said pressure chamber through said passage means when said valve means is shifted from said first position, said branch extending through said valve means to communicate with said one groove.

4. The invention of claim 1:
said housing further including an exhaust communicating with a fluid pressure reservoir, said housing defining a bore therewithin communicated with said inlet, said outlet, and said exhaust;
said valve means being a spool valve slidably mounted in said bore and having spaced grooves and lands cooperating with corresponding grooves and lands on the wall of the bore, one of said grooves communicating with said inlet, another groove communicating with said passage means, said valve means in said first position blocking communication between said one and another grooves but permitting communication therebetween as said spool valve is shifted away from said first position, said branch communicating said one groove with said passage means.

5. In a hydraulic brake booster:
a housing defining a pressure chamber therewithin;
said housing having an inlet communicated to a fluid pressure source, and an outlet;
valve means movable within said housing from a first position venting said pressure chamber and preventing communication from the inlet to the pressure chamber to a second position, said valve means communicating successively higher fluid pressure levels from said inlet into said pressure chamber as the valve means is shifted from said first position;
an output piston slidably mounted in said pressure chamber and responsive to the fluid pressure communicated into the latter;
operator-actuated means for operating said valve means;

a check valve controlling communication between said pressure chamber and the inlet;

said check valve permitting communication between the pressure chamber and the inlet whenever the pressure level in the pressure chamber exceeds the pressure level in the inlet, but prohibiting communication in the reverse direction;

passage means extending through said valve means to communicate said inlet with said pressure chamber as the valve means is moved away from the first position, said passage means venting the pressure chamber when the valve means is in the first position and communication from said inlet through said passage means is prevented, said valve means controlling communication through said passage means to control the pressure level in the pressure chamber;

said passage means including a branch communicated with said inlet independently of the position of said valve means, said check valve being located in said branch.

6. The invention of claim 5:

said valve means being a spool valve slidably mounted in said housing, said spool valve having spaced grooves and lands cooperating with corresponding grooves and lands on said housing, one of said grooves communicating with said inlet, said valve means communicating said one groove to said pressure chamber through said passage means as said spool valve is shifted from said first position, said branch extending through said valve means to communicate with said one groove.

7. The invention of claim 5:

said housing further including an exhaust communicating with a fluid pressure reservoir, said housing defining a bore therewithin communicated with said inlet, said outlet, and said exhaust;

said valve means being a spool valve slidably mounted in said bore and having spaced grooves and lands cooperating with corresponding grooves and lands on the wall of the bore, one of said grooves communicating with said inlet, another groove communicating with said passage means, said valve means in said first position blocking communication between said one and another grooves but permitting communication therebetween as said spool valve is shifted away from said first position, said branch communicating said one groove with said passage means.

* * * * *